May 3, 1938.  S. F. BAKER  2,116,486
DUAL AXLE UNIT
Filed Nov. 19, 1936  2 Sheets-Sheet 1
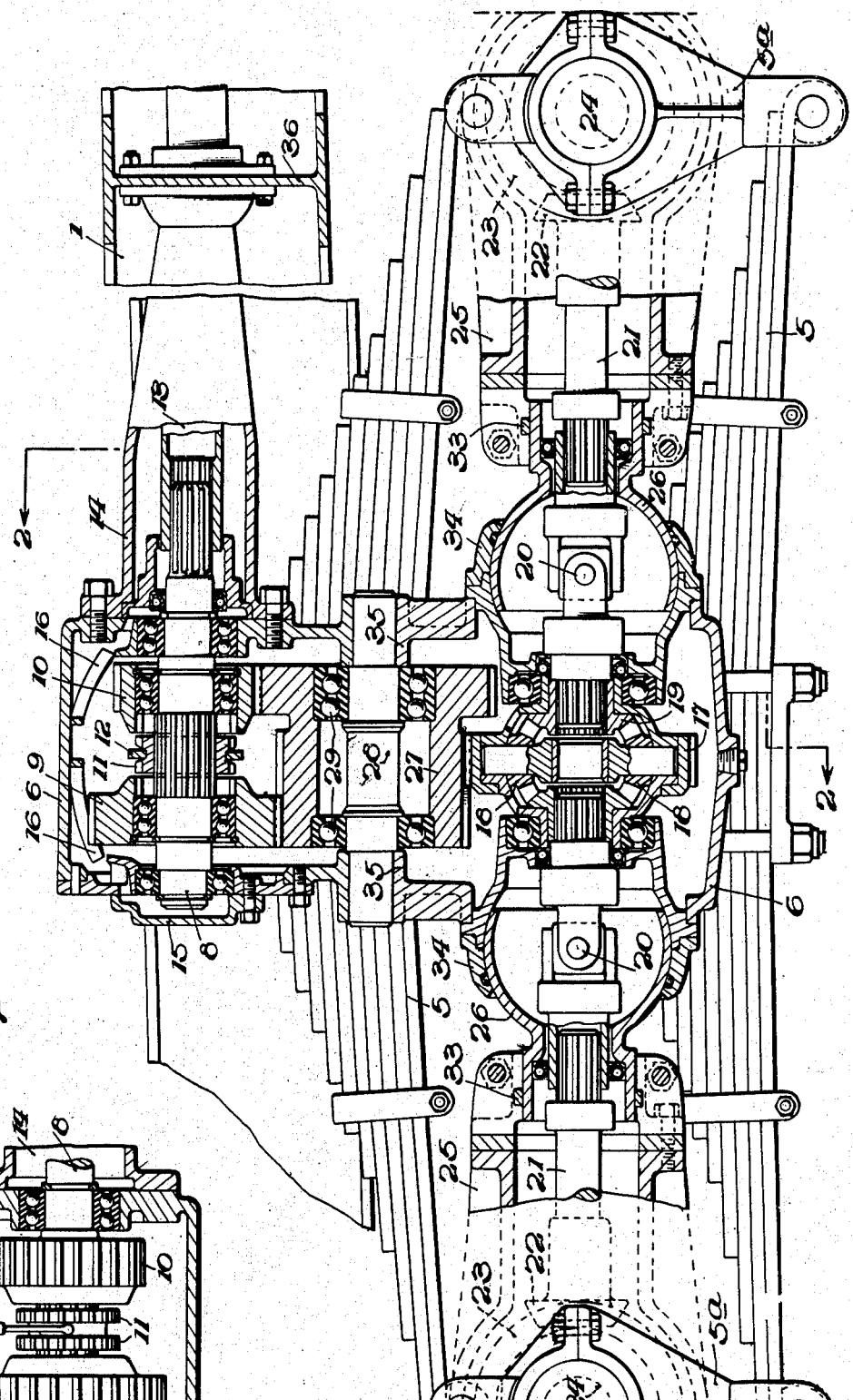
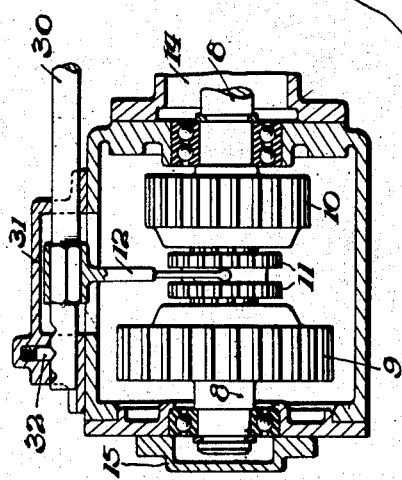
Inventor
Solomon F. Baker
By Cameron, Kerkam & Sutton
Attorneys May 3, 1938.   S. F. BAKER   2,116,486
DUAL AXLE UNIT
Filed Nov. 19, 1936   2 Sheets-Sheet 2

Inventor
Solomon F. Baker
By Cameron, Kerkam & Sutton
Attorneys

Patented May 3, 1938

2,116,486

UNITED STATES PATENT OFFICE 2,116,486

DUAL AXLE UNIT

Solomon F. Baker, Detroit, Mich., assignor, by mesne assignments, to Patent Developers, Inc., Detroit, Mich., a corporation of Michigan Application November 19, 1936, Serial No. 111,735

10 Claims. (Cl. 180—22)

This invention relates to dual axle driving units for motor vehicles, and more particularly to the construction and mounting of the transmission casings in units of this character.

In a transmission unit of the type in question wherein a propeller shaft transmits power to the dual driving axles through a train of gears mounted on vertically spaced axes it is necessary to employ a relatively large transmission casing or housing. Since these housings, as heretofore constructed, are subject to a variety of stresses and strains arising both from the transmission of torque and from the irregular movements of the driving wheels of the vehicle during operation, it has been necessary to make the housings of heavy and expensive construction. The principal objects of the present invention are therefore directed to the relief of stresses and strains arising from the transmission of torque and other operating conditions, and to the provision of an improved transmission and transmission housing and novel means for mounting and strengthening the same.

One of the objects is to provide a cross-brace substantially centrally of the transmission casing or housing and to employ this cross-brace as a gear supporting member, thereby rigidifying the housing and at the same time distributing the loading of the central or idler gears over the housing generally.

More specifically, it is proposed to render stationary the lay shaft of the gear train, and to fix this shaft with respect to the walls of the casing so that it may act as a true brace. In this manner it is possible to employ a substantially lighter casing which, at the same time, will be less likely to distort under the stresses and strains produced by the relatively severe operating conditions encountered by dual axle drive vehicles.

Another object is to provide improved means for mounting the transmission casing of a dual axle drive unit on the frame of a vehicle and for preventing undesirable movement of said casing relatively to the frame during operation of the vehicle.

A further object is to additionally strengthen the casing adjacent the propeller shaft gears while improving the lubrication thereof. In attaining this object, there are provided ribs interiorly of the top of the casing and a cap for the end of the upper gear shaft, this cap being securely fixed to the casing and forming a well whereby lubricant from the top of the casing may follow the ribs in draining through the bearings and back into the casing proper.

Still another object is to so divide the housing that assembly and disassembly of the idler gear shaft as well as the other parts of the transmission may be readily accomplished.

A still further object is to provide an improved shifter device for use in connection with the change speed gearing of a dual axle drive unit of the character to which the invention pertains.

These and other objects and advantages of the invention will become more fully apparent hereinafter as reference is had to the accompanying drawings wherein one embodiment of the invention is illustrated by way of example only and in which:

Fig. 1 is a vertical section through one form of dual axle drive unit embodying the invention, taken substantially along the line 1—1 of Fig. 2 but with certain parts shown in full and others broken away in order to more clearly illustrate the construction;

Fig. 3 is a horizontal section through the upper end of the transmission casing taken substantially along the line 3—3 of Fig. 2.

Figure 2:
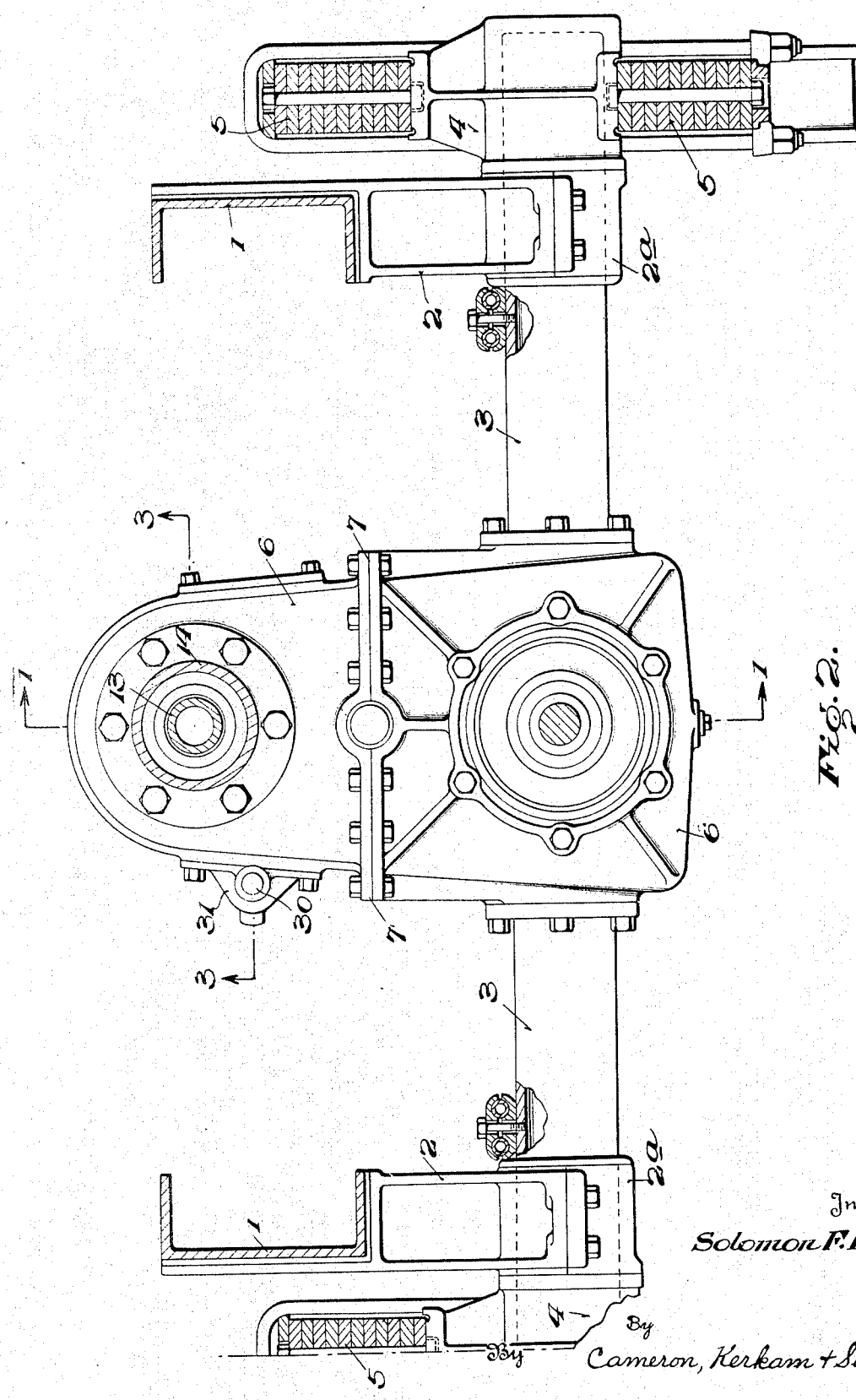
Fig. 2 is an end elevation, partially in section, of the unit shown in Fig. 1, the section being taken substantially along the line 2—2 of Fig. 1.

In the drawings, wherein like reference characters indicate like parts throughout the several views, 1 indicates the frame of a motor vehicle to which are secured, at positions between the dual driving axles (indicated at 24 in Fig. 1), a pair of trunnion brackets 2. The trunnion brackets 2 are provided with lower removable bearing caps 2a which are adapted to be suitably secured to the brackets as by bolts and to clamp thereto the outer ends of a pair of trunnions 3. The inner ends of trunnions 3 are bolted or otherwise secured to and support a casing 6 within which are housed the elements of a variable speed, differential equipped gear train adapted to transmit driving torque from the propeller shaft 13 of the vehicle to the two tandem driving axles 24. The outer ends of trunnions 3, which extend outwardly beyond the trunnion brackets 2, serve to support trunnion caps 4 which are pivotally mounted thereon and to which are secured the mid-points of the main vehicle springs 5, the latter being arranged in pairs with the adjacent ends of each pair interconnected by suitable brackets 5a in which are rotatably supported the housings of driving axles 24.

As shown best in Fig. 2, the transmission casing 6 is divided along a horizontal plane above the axis of trunnions 3 into bottom and top portions adapted to be bolted together as at 7. The top portion of the casing has journalled therein in suitable bearings a shaft 8 upon which are rotatably mounted a pair of gears 9 and 10 of different sizes and on which is splined a shifter clutch 11 engaged and operated by a fork 12 and adapted either to drivingly connect said shaft to one or the other of said gears or to permit said shaft to rotate without driving either gear. In the embodiment illustrated, the shaft 8 is connected by splines at one end to and driven by the vehicle propeller shaft 13, the other end of shaft 8 extending through the bearing carried by the rear wall of casing 6 and being covered by a cap 15 which is so arranged as to form a well into which lubricant is adapted to drain through a suitable lipped passageway in the bearing supporting plate from the ribs 16 formed interiorly of the top of the casing 6.

As illustrated in Fig. 3, the shank of fork 12 extends laterally outwardly through a suitable opening in the casing 6 and is secured to a shifter bar or rod 30 adapted to be operated from the driver's position of the vehicle. A suitable cover plate 31, detachably secured to casing 6 as by bolts, slidably supports shifter bar 30 and covers the opening in the side of the casing through which the fork shank extends, said plate also housing a spring pressed detent 32 adapted to engage any one of three notches formed in bar 30 so as to yieldingly maintain the shifter clutch 11 in whichever of its three operative positions may be selected by the operator. With this construction, the shifter fork 12, bar 30, detent 32 and cover plate 31 may be mounted and demounted as a unit independently of the mechanism within casing 6.

The lower section of the housing 6 rotatably supports in suitable bearings a differential gearing arrangement including a driving gear 17, pinions 18 and sun gears 19, the latter being drivingly connected to a pair of relatively short shafts 21 through universal joints 20 both sides of which joints are splined to give a full floating relation. The shafts 21 transmit the driving torque from the differential gearing to pinions 22 which engage the gears 23 drivingly connected, as through the usual differentials, to the dual axles 24. The pinions 22, gears 23, axles 24 and the major portions of the shafts 21 reside in banjo housings 25 slidably connected at 33 to torque bells 26 which have swivel fits in the bell housings 34 fixed to the casing 6.

In order to transmit the driving torque from shaft 8 and its selective gears 9 and 10 to the differential gearing an integrally formed multiple gear 27 is interposed therebetween, one portion of said gear being in permanent mesh with both gear 9 and driving gear 17 of the differential and the other portion permanently meshing with gear 10. This multiple gear 27 is rotatably mounted on a stationary lay shaft 28 by means of bearings 29 located at the ends of the gear, the shaft 28 having its axis positioned in the plane of division between the upper and lower portions of the casing 6 and being tightly clamped in place therebetween upon assembly of the casing.

It will be noted that there is substantial spacing between the end faces of gears 9, 10 and 27 and the walls of the casing 6. This is a highly desirable feature in that it permits the free return of lubricant to the bottom of the casing, as distinguished from a structure having walls so close to the gears that an upward pumping action interferes with the intended circulation of the lubricant. In order to assist in accomplishing this result, bosses 35 are provided which extend substantially into the casing 6 for abutment against the inner races of the bearings 29 for the multiple gear 27 mounted on fixed lay shaft 28.

In a dual axle drive unit of the construction above described, there is a tendency for the transmission housing 6 to rotate about the axis of trunnions 3 due to torque reaction and other stresses produced during operation of the vehicle, particularly when passing over rough ground. The invention therefore includes means for resisting and preventing such undesirable movement of the transmission casing, said means taking the form of a torque tube 14 surrounding the propeller shaft 13 and secured at its forward and rear ends, respectively, to a fixed cross member 36 of the vehicle frame and the upper portion of the transmission casing 6 adjacent the bearing for the forward end of shaft 8. While the use of a torque tube of this character effectively prevents rotational movement of the transmission casing about the trunnion axis, it also gives rise to undesired stresses tending to flex the walls of the casing, particularly when the casing is relatively large as is usual in units of this type. Distortion or straining of the casing as a result of these stresses is subtantially prevented, however, by fixedly clamping the lay shaft 28 in non-rotatable relation between the upper and lower portions of the casing 6 in such a manner as to materially rigidify the casing walls.

There is thus provided by the present invention a structurally simple, strong and readily assembled dual axle drive unit which is of new and improved construction and includes novel means for mounting and strengthening the transmission housing thereof. Although only one specific form of unit has been described and illustrated in the accompanying drawings, it is obvious that the invention is not limited to the particular structure disclosed but is capable of a variety of mechanical embodiments. Various changes which will now become apparent to those skilled in the art, may be made in the form, details of construction and arrangement of the parts shown without departing from the spirit of the invention. Reference is therefore to be had to the appended claims for a definition of the limits of the invention.

This application is a continuation in part of Serial No. 2,721, filed January 21, 1935.

What is claimed is:

1. In a dual axle drive for motor vehicles wherein the vehicle propeller shaft drives said axles through a transmission located between the axles, a gear casing located between said dual driving axles, trunnion members extending laterally from the lower portion of said casing and supporting the latter from the vehicle frame, a driving shaft rotatably mounted in the upper portion of said casing and operatively connected with the vehicle propeller shaft, means including gearing mounted in said casing for transmitting driving torque from said driving shaft to said axles, and a rigid element secured both to the upper portion of said casing and to a fixed portion of the vehicle frame so as to oppose rotative movement of said casing with respect to the axis of said trunnion members.

2. In a dual axle drive for motor vehicles wherein the vehicle propeller shaft drives said axles through a transmission located between the axles, a gear casing located between said dual driving axles, trunnion members extending laterally from the lower portion of said casing and supporting the latter from the vehicle frame, a driving shaft rotatably mounted in the upper portion of said casing and operatively connected with the vehicle propeller shaft, means including gearing mounted in said casing for transmitting driving torque from said driving shaft to said axles, a rigid element secured both to the upper portion of said casing and to a fixed portion of the vehicle frame so as to oppose rotative movement of said casing with respect to the axis of said trunnion members, and a bracing member rigidly connecting two of the opposite walls of said casing and reinforcing the same against the stresses set up by opposition of said element to said rotative movement of the casing, said bracing member lying intermediate the horizontal axial planes of said driving shaft and trunnion members.

3. In a dual axle drive for motor vehicles wherein the vehicle propeller shaft drives said axles through a transmission located between the axles, a gear casing located between said dual driving axles, trunnion members extending laterally from the lower portion of said casing and supporting the latter from the vehicle frame, a driving shaft rotatably mounted in the upper portion of said casing and operatively connected with the vehicle propeller shaft, a second shaft mounted in the intermediate portion of said casing between the horizontal axial planes of said driving shaft and trunnion members, intermeshed gears mounted on said shafts, means mounted in the lower portion of said casing for transmitting driving torque from said gears to the driving axles, and a rigid element secured both to the upper portion of said casing and to a fixed portion of the vehicle frame so as to oppose rotative movement of said casing with respect to the axis of said trunnion members.

4. In a dual axle drive for motor vehicles wherein the vehicle propeller shaft drives said axles through a transmission located between the axles, a gear casing located between said dual driving axles, trunnion members extending laterally from the lower portion of said casing and supporting the latter from the vehicle frame, a driving shaft rotatably mounted in the upper portion of said casing and operatively connected with the vehicle propeller shaft, a second shaft mounted in the intermediate portion of said casing between the horizontal axial planes of said driving shaft and trunnion members, intermeshed gears mounted on said shafts, means mounted in the lower portion of said casing for transmitting driving torque from said gears to the driving axles, and a rigid element secured both to the upper portion of said casing and to a fixed portion of the vehicle frame so as to oppose rotative movement of said casing with respect to the axis of said trunnion members, said second shaft being fixedly secured to two of the opposite walls of said casing and reinforcing the same against the stresses set up by opposition of said rigid element to said rotative movement of the casing.

5. In a transmission for the dual driving axles of a motor vehicle wherein a propeller shaft drives two axles through a train of gearing located between said axles, a gear casing, trunnions supporting said casing from the frame of said vehicle, a gear shaft supported in said casing in a direct driven relation with the propeller shaft, a rigid torque tube secured at its ends to said casing and a fixed portion of said vehicle frame and opposing rotative movement of said casing with respect to the axis of said trunnions, a second gear shaft fixed in said casing, intermeshed gears mounted on said shafts, and axle driving gear members mounted in said casing below said second gear shaft and in driven relation with said intermeshed gears, said second gear shaft being mounted in said casing between the trunnions and said torque tube and reinforcing said casing to prevent strains therein as a result of stresses set up by the opposition of said torque tube to rotative movement of said casing.

6. In a transmission for the dual driving axles of a motor vehicle wherein a propeller shaft drives two axles through a train of gearing located between said axles, a transmission casing, trunnions supporting said casing from the frame of said vehicle, a rigid element connected both to said casing at a point remote from said trunnions and to a fixed portion of the vehicle frame and opposing rotative movement of said casing relative to the axis of said trunnions, gears journalled in said casing for selective driven connection with the propeller shaft, a lay shaft having gears rotatable thereon and in mesh with the first named gears, and further gears journalled in said casing in mesh with the gears of said lay shaft, said lay shaft being fixedly secured to opposite walls of said casing to prevent strains therein due to stresses set up by opposition of said rigid element to rotative movement of said casing.

7. In a transmission for the dual driving axles of a motor vehicle wherein a propeller shaft drives two axles through a train of gearing located between said axles, a transmission housing for the gear train divided horizontally into upper and lower sections, supporting trunnions extending laterally from the lower section of said housing and supporting the latter from the frame of said vehicle, a rigid element connected both to the upper section of said housing and to a fixed portion of the vehicle frame and opposing rotative movement of said housing about the axis of said trunnions, a gear shaft journalled in said upper section and drivably connected with the propeller shaft, a lay shaft rigidly clamped between said housing sections at the juncture thereof, gearing mounted on said gear and lay shafts and means including additional gearing supported in said lower section for driving said axles.

8. In a transmission for the dual driving axles of a motor vehicle wherein a propeller shaft drives two axles through a train of gearing located between said axles, a transmission housing for the gear train divided horizontally into upper and lower sections, trunnions attached to said lower section and supporting the same from the frame of said vehicle, a gear shaft journalled in said upper section and having gearing thereon and a direct driven connection with the propeller shaft, a rigid element connected at one end to said upper section adjacent said propeller shaft and at the other end to a fixed portion of the vehicle frame, a lay shaft fixedly supported by said housing at the juncture of said sections and having gears mounted thereon for rotation with respect thereto and in driven relation to the gearing on said gear shaft, and additional gearing journalled in said lower section for actuation from the gears of said lay shaft.

9. In a transmission for the dual driving axles of a motor vehicle wherein a propeller shaft drives two axles through a train of gearing located between said axles, a transmission housing for the gear train divided horizontally into upper and lower sections, the lower section being supported from the frame of said vehicle by trunnions and the upper section having secured thereto a rigid element also secured to a fixed portion of the vehicle frame and opposing movement of said housing about the axis of said trunnions, a gear shaft journalled in said upper section and having gearing thereon and a direct driven connection with the propeller shaft, a lay shaft non-rotatably fixed to said casing between said trunnions and rigid element and having idler gears thereon rotatable with respect thereto, said idler gears being integral and having common bearings on said lay shaft, and axle driving gears rotatably supported in said housing in driven relation to the gears on said lay shaft.

10. In a transmission for the dual driving axles of a motor vehicle wherein a propeller shaft drives two axles through a train of gearing located between said axles, a transmission housing for said gear train divided horizontally into upper and lower sections, a gear shaft journalled in said upper section and having gearing thereon and a direct driven connection with the propeller shaft, a lay shaft rigidly clamped between said sections at the juncture thereof, said housing having bosses extending substantially inwardly thereof about the openings for said lay shaft, gears rotatable on said lay shaft in mesh with the gearing on said gear shaft, said bosses constituting means for spacing said lay shaft gears from the walls of said casing whereby an open lubricant return path is provided, additional gearing journalled in said casing below said lay shaft gears and in engagement therewith, the lower section of said housing having trunnions extending laterally thereof and providing supports therefor, and a torque tube connected to said upper section and to a fixed portion of the vehicle frame and supporting said housing against rotative movement about the axis of said trunnions, said lay shaft being secured to said housing sections whereby it rigidifies the walls thereof to prevent straining thereof in the presence of external forces tending to cause rotative movement of said housing about the axes of said trunnions.

SOLOMON F. BAKER.